United States Patent [19]

Barrowman

[11] Patent Number: 4,675,148
[45] Date of Patent: Jun. 23, 1987

[54] FAILED FUEL DETECTION ARRANGEMENTS

[75] Inventor: Gavin R. Barrowman, Stockport, England

[73] Assignee: National Nuclear Corporation Limited, Knutsford, England

[21] Appl. No.: 748,452

[22] Filed: Jun. 25, 1985

[30] Foreign Application Priority Data

Jul. 23, 1984 [GB] United Kingdom ............... 8418692

[51] Int. Cl.⁴ .......................................... G21C 17/00
[52] U.S. Cl. ..................................... 376/253; 376/315
[58] Field of Search ................................ 376/253, 315

[56] References Cited

U.S. PATENT DOCUMENTS

| | | | |
|---|---|---|---|
| 3,612,860 | 10/1971 | Hackney | 376/253 |
| 3,806,409 | 4/1974 | Debergh et al. | 376/253 |
| 3,947,318 | 3/1976 | Zhuchkov et al. | 376/253 |
| 4,207,922 | 6/1980 | Andrieux et al. | 376/253 |
| 4,332,639 | 6/1982 | Crosgrave et al. | 376/253 |
| 4,527,955 | 7/1985 | Duncombe et al. | 376/253 |
| 4,565,667 | 1/1986 | Duncombe et al. | 376/253 |
| 4,581,198 | 4/1986 | Kamei et al. | 376/253 |

OTHER PUBLICATIONS

Nuc. Eng. Int. (7/71), pp. 570–580, Chapelot.

Primary Examiner—Salvatore Cangialosi
Attorney, Agent, or Firm—William R. Hinds

[57] ABSTRACT

In the detection of failed fuel in liquid metal cooled nuclear reactors, a helical annular linear induction pump (5,6) electromagnetically pumps coolant in sampling pipes (4) from fuel sub-assemblies of the reactor core to a selector mechanism (9,10) which collects, in turn, the discharge from each sampling pipe (4) for supply to equipment for monitoring for the presence in the coolant of products indicative of fuel failure. The selector mechanism collects the discharge without contacting the sampling pipes (4) and the same pump (5,6) is employed to pump the selected samples via pipe 11 to the monitoring equipment. This pump may also serve to pump a proportion of the bulked sample from the non-selected sampling pipes after discharge into a vessel (7), the bulked sample being conducted through the pump via pipes (13).

4 Claims, 4 Drawing Figures

FAILED FUEL DETECTION ARRANGEMENTS

BACKGROUND OF THE INVENTION

This invention relates to arrangements for the detection of failed fuel in nuclear reactors cooled by liquid metal.

The fuel for nuclear reactors of the fast breeder, liquid metal cooled kind is usually contained in closed sheaths in the form of pins, the pins being disposed side by side in axial disposition in an open-ended envelope usually termed a wrapper, there being a number of support and spacing grids by means of which the pins are retained and positioned in the wrapper, forming a fuel sub-assembly which, together with a multiplicity of other sub-assemblies in adjacent relationship form the core of the nuclear reactor, liquid metal being caused to flow upwardly through the sub-assembly to remove fission generated heat from the fuel pins by heat exchange. It is necessary to be able to detect any failure of the sheathing of the fuel pins of a particular sub-assembly so that such sub-assembly can be removed and replaced at the earliest opportunity to avoid contaminating the coolant and prejudicing the safety of the reactor.

Failed fuel detection for nuclear reactors of the kind described in the foregoing paragraphs has generally taken the form of employing one coolant sampling pipe for each fuel sub-assembly of the core. The pipes are terminated at respective ports of a multi-port selection valve by means of which sequential samples are taken, each being subjected to measurement for detection of the presence of fission products which would indicate one or more fuel sheathing failures in the particular fuel sub-assembly associated with the selected port. It is necessary to employ a liquid metal pump to effect circulation of each sample from the relevant sub-assembly to the selector, from thence to the measuring equipment, and from thence back to the liquid metal pool of the nuclear reactor. The kind of pump which has been found particularly effective for this purpose is a helical annular linear induction pump known in the art by the combination of its initials, HALIP. The HALIP can accommodate, in its annulus, a large number of ducts, to provide a variation of HALIP known in the art as a multi-duct HALIP. Reference is directed to British Patent Specification Nos. 1,413,304 and 1,556,258 for information concerning HALIPs.

Selector valves which rely on a contacting principle such as a rotary selection arm with a rubbing seal have the disadvantage that the rubbing seal can give trouble due to wear or foreign matter, and such failure prejudices the whole detection system. A solution to this problem is disclosed in European Published Patent Application No. 0084409 in which the rotary selector arm registers, in turn, with outlets of the sampling pipes but without making contact therewith and HALIPs are located upstream and downstream of the outlets whereby the upstream HALIP serves to impel the coolant across the gaps between outlets and selector arm and the downstream HALIP pumps the selected sample to a device for monitoring the selected sample for products indicative of fuel failure. The non-selected samples are collected following discharge from the sampling pipe outlets to provide a bulk sample which is fed to other failed fuel monitoring equiment. Such an arrangement requires three pumps, ie. the upstream and downstream HALIPs and a further pump for feeding the bulk sample to the bulk monitoring equipment and results in a complex construction involving at least two HALIPs, a mass of coolant sampling pipes and a rotary collector arm, as well as the necessary electrical cabling for the HALIPs, all of which must necessarily be accommodated as compactly as possible in view of the limited space available in the reactor for such instrumentation.

FEATURES AND ASPECTS OF THE INVENTION

The present invention seeks to emulate the apparatus disclosed in European Published Patent Application No. 0084409 by avoiding the need for a selector operating on a contact principle while, at the same time, achieving a more compact construction.

According to the present invention there is provided failed fuel detection apparatus comprising a plurality of liquid coolant sampling pipes, non-contacting means for selecting said pipes in turn for connection to means for monitoring for the presence in said coolant of products indicative of fuel failure and means for electromagnetically pumping coolant upstream and downstream of said selecting means, characterised in that said pumping means comprises a single pump through which pass said sampling pipes and at least one pipe conducting coolant downstream of said selecting means.

DESCRIPTION OF THE DRAWINGS

A construction embodying the invention will now be described by way of example with reference to the accompanying drawing, wherein.

DESCRIPTION OF PREFERRED EMBODIMENTS

Figure 1:
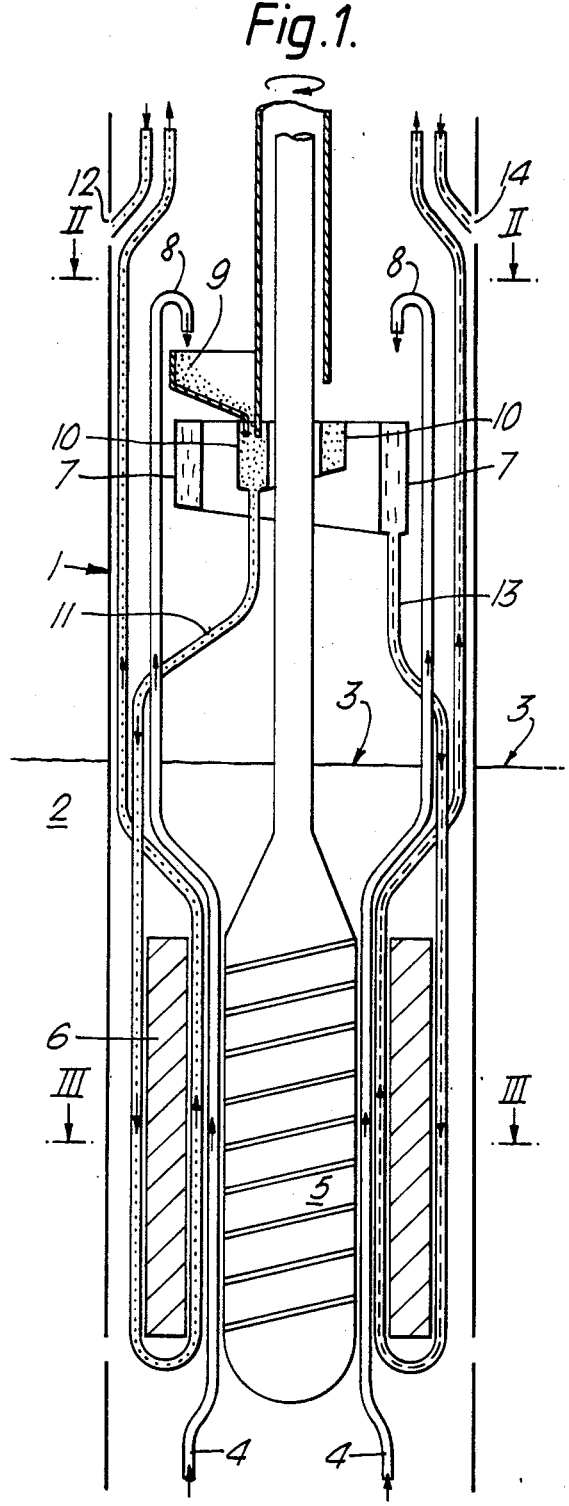
FIG. 1 is a diagrammatic side view in section of a sample selection and pumping unit.
Figure 2:
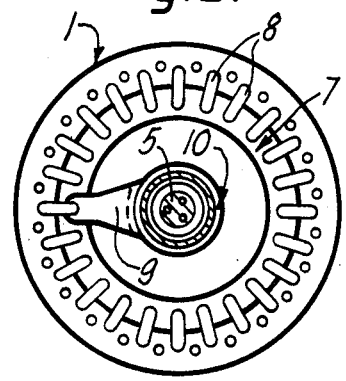
FIG. 2 and 3 are detached sections on lines II—II and III—III of FIG. 1, respectively.
Figure 3:
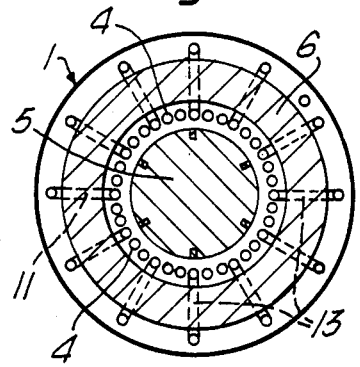
Figure 4:
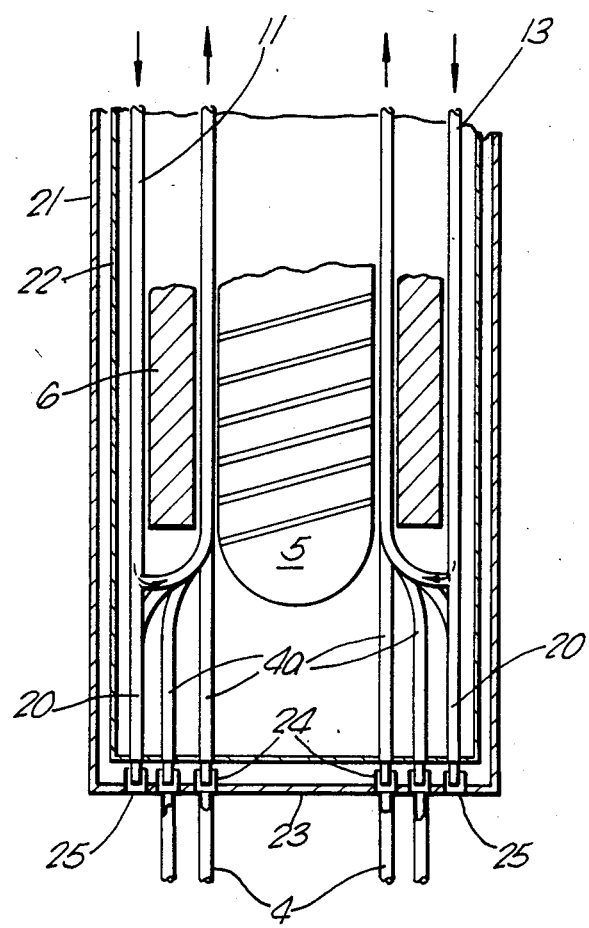
FIG. 4 is a fragmentary view illustrating a modification for ensuring self-priming of the apparatus.

Referring to FIGS. 1–3, a multi-duct HALIP 1 is disposed in the sodium pool 2 of a fast breeder reactor cooled by liquid sodium, the level of the pool being indicated by reference numeral 3, the multi-duct HALIP having a multiplicity of inlet coolant sodium sample pipes 4 each extending from the upper end of a fuel sub-assembly (not shown but known in the art) to lie annularly and adjacent the electrical core 5 and within the annulus between the core 5 and an outer metal sleeve 6 of the HALIP. The pipes 4 extend upwardly to discharge into a fixed annular trough 7 through turn-back portions 8 of the pipes 4. A rotatable funnel collector 9 serves to catch individual samples and divert them to another fixed annular trough 10, from whence a pipe 11 makes firstly a downwards pass outside the HALIP, in the downwards direction outside, and then in an upwards direction inside, the metal sleeve 6. The upwards pass of the pipe 11 through the HALIP leads the pumped sample off to the measuring and detection monitors, not shown, finally discharging to the pool at 12.

The annular trough 7 serves to bulk the samples and has pipes 13 (one only of which is shown in FIG. 1) extending in a downwards pass outside, and in an upwards pass inside, the sleeve 6, the upwards pass being pumped to the monitors (not shown), finally discharging to the pool at 14. Any excess flow from the troughs 7, 10 overflows within the HALIP and returns to the pool. The flows in all the pipes are simultaneous and continuous and their directions are shown by the arrows in FIG. 1.

The number of ducts may be chosen to suit a particular requirement. In one application, for instance, 40 samples are pumped through 40 ducts of a 60 duct HALIP. One sample is selected and ducted back to the pump inlet to pass through the 41st duct in the HALIP to provide the second pumping stage for the single sample. The remaining 39 samples are collected in the second collecting trough where they mix together to form a bulk sample. A portion of this bulk sample, equal in quantity to 19 single samples, is ducted through the remaining 19 ducts in the HALIP to provide the second pumping stage for the bulk sample. The excess of (39−19)=20 mixed samples overflows from the collecting trough to discharge back to the liquid metal pool.

As depicted in FIGS. 1-3, the second pass loops through the pump will not fill as the unit is immersed into the sodium pool. To ensure self-priming therefore each of the pipes 11, 13 is provided with a primary leg 20 into which the sodiun can flow as the unit is lowered into the sodium pool. These legs 20 require sealing when the unit is operating normally. This can be achieved by installing the unit (the casing of which is depicted by reference numeral 22) in a fixed standpipe penetration 21 at whose base 23 the sampling pipes 4 terminate in plug-in connections 24 with sampling pipe continuations 4a. The base 23 also includes plug devices 25 which the priming legs 20 enter when the unit is fully installed in the penetration 21 thereby sealing the lower ends of the legs 20.

I claim:

1. Failed fuel detection apparatus for a nuclear reactor comprising a plurality of liquid coolant sampling pipes, non-contacting means for selecting said pipes in turn for connection to means for monitoring for the presence in said coolant of products indicative of fuel failure, and means for electromagnetically pumping coolant upstream and downstream of said selecting means, characterised in that said pumping means comprises a single pump through which pass said sampling pipes conducting coolant to said selecting means and at least one pipe conducting coolant downstream of said selecting means and toward said monitoring means.

2. Apparatus as claimed in claim 1 in which all of said sampling pipes discharge towards a common collecting vessel and in which said selecting means is arranged to intervene and collect, in turn, the discharge from each sampling pipe while the discharge from the remaining sampling pipes is collected by said vessel, the coolant collected by the selecting means being routed back to said pump by a said downstream pipe.

3. Apparatus as claimed in claim 2 in which at least a proportion of the coolant collected by said vessel is routed back to said pump by further ones of said downstream pipes.

4. Apparatus as claimed in claim 3 in which the number of downstream pipes feeding coolant back to said pump from the collecting vessel is less than the number of sampling pipe discharging into said vessel.

* * * * *